(12) United States Patent
Thomas et al.

(10) Patent No.: US 6,504,506 B1
(45) Date of Patent: *Jan. 7, 2003

(54) METHOD AND DEVICE FOR FIXED IN TIME ADAPTIVE ANTENNA COMBINING WEIGHTS

(75) Inventors: Timothy A. Thomas, Palatine, IL (US); Frederick W. Vook, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 245 days.

This patent is subject to a terminal disclaimer.

(21) Appl. No.: 09/607,733

(22) Filed: Jun. 30, 2000

(51) Int. Cl.$^7$ .................................................. G01S 3/28

(52) U.S. Cl. ........................................ 342/383; 342/367

(58) Field of Search ................................. 342/361, 367, 342/378, 383; 455/67.6, 205

(56) References Cited

U.S. PATENT DOCUMENTS

| | | | | | |
|---|---|---|---|---|---|
| 5,559,757 | A | * | 9/1996 | Catipovic et al. | 367/134 |
| 5,617,099 | A | * | 4/1997 | Warren et al. | 342/159 |
| 5,796,779 | A | * | 8/1998 | Nussbaum et al. | 375/267 |
| 5,982,327 | A | * | 11/1999 | Vook et al. | 342/380 |
| 6,215,983 | B1 | * | 4/2001 | Dogan et al. | 455/63 |

OTHER PUBLICATIONS

Article entitled "Adaptive Frequency–Domain Equalization and Diversity Combining For Broadband Wireless Communications," (Author, Martin V. Clark, *IEEE JSAC*, vol. 16, pp. 1385–1395, Oct. 1998).

Article entitled "Basis Expansions Models and Diversity Techniques for Blind Identification and Equalization of Time–Varying Channels," (Author Georgios B. Giannakis, *Proc. IEEE*, vol. 86, No. 10, pp. 1969–1986, Oct. 1998).

Article entitled "Characterization of Fast Fading Vector Channels for Multi–Antenna Communication Systems," (Authors Gregory Raleigh, Suhas N. Diggavi, Ayman F. Naguib, Arogyaswami Paulraj, Proc. 28th, Asilomar Conf., Pacific Grove Ca, 5 pp., Nov. 1994).

Article entitled "Deterministic Approaches for Blind Equalization of Time–Varying Channels with Antenna Arrays," (Authors Hui Liu, Georgios B. Giannakis, *IEEE Trans on Sig. Proc.*, vol. 46, No. 11, pp. 3003–3013, Nov. 1998).

Article entitled "Least–Squares Multi–User Frequency–Domain Channel Estimation for Broadband Wireless Communication Systems," (Authors Timothy A. Thomas, Fred W. Vook and Kevin L. Baum, 37th Allerton Conference, Monticello, IL, 10 pp., Sep. 1999).

Article entitled "Linear and Nonlinear Programming," (Author David G. Luenberger, Addison–Wesley Publishing Company, Monlo Park, CA, pp. 215–216, 1989).

(List continued on next page.)

*Primary Examiner*—Dao Phan
(74) *Attorney, Agent, or Firm*—Douglas D. Fekete; Daniel W. Juffernbruch

(57) ABSTRACT

A receiving device and method for operating a communication system are provided. The receiving device receives at least one Doppler channel estimate for at least one transmitter and a spatial covariance matrix of a corrupting environment. The Doppler channel estimates are used to create a Null Doppler spatial covariance matrix. A total Doppler spatial covariance matrix is created as a sum of the spatial covariance matrix of the corrupting environment, plus the Doppler spatial covariance matrix. A combining weight for at least one transmitter and at least one Doppler channel is created from the total Doppler spatial covariance and the at least one Doppler channel for the at least one transmitter.

18 Claims, 5 Drawing Sheets

OTHER PUBLICATIONS

Article entitled "Multicarrier Modulation for Data Transmission: An Idea Whose Time Has Come," (Author John A. C. Bingham, *IEEE Comm. Mag.*, vol. 28, pp. 5–14, May 1990).

Article entitled "Robust Channel Estimation for OFDM Systems with Rapid Dispersive Fading Channels," (Authors Ye G. Li, Leonard J. Cimini, Jr., Nelson R. Sollenberger, *IEEE Trans. On Comm.*, vol. 46, pp. 902–915, Jul. 1998).

Article entitled "Sinusoidal Model and Prediction of Fast Fading Processes," (Authors Jeng–Kuang Hwang, Jack H. Winters, Globecom, pp. 892–897, 1998).

Article entitled "Space–Time Modems for Wireless Personal Communications," (Author A. J. Paulraj, Boon C. Ng, *IEEE Personal Communications Magazine*, pp. 36–48, Feb. 1998).

Article entitled "Analysis of DFT–Based Channel Estimators for OFDM*" (Authors Ove Edfors, Magnus Sandell, Jan–Jaap van de Beek, Sara Kate Wilson, Per Ola Börjesson, This work has been presented in part at the 1995 Vehicular Technology Conference (VTC '96) in Chicago, Illinois, Jul. 25–28, 1995, pp. 815–819).

Article entitled "Channel Estimation for OFDM Systems with Transmitter Diversity in Mobile Wireless Channels" (Authors Ye(Geoffrey) Li, Senior Member, IEEE, Nambirajan Seshadri, Senior Member, IEEE, and Sirikiat Ariyavisitakul, Senior Member, IEEE, pp. 461–471, *IEEE Journal on Selected Areas in Communications*, vol. 17, No. 3, Mar. 1999).

* cited by examiner

METHOD AND DEVICE FOR FIXED IN TIME ADAPTIVE ANTENNA COMBINING WEIGHTS

This application is related to Ser. No.: 09/607,736 and 09/608,760, both filed on Jun. 30, 2000.

FIELD OF THE INVENTION

The present invention generally relates to the field of communication systems and more particularly, to establishing the adaptive antenna combining weights for at least one desired signal received by at least one antenna for the purposes of receiving transmitted data.

BACKGROUND OF THE INVENTION

In a wireless communication system, a major design challenge is to maximize system capacity and performance in the presence of interference, and a time-varying multipath channel. Multipath propagation is caused by the transmitted signal reflecting off objects near the transmitter and receiver and arriving at the receiver over multiple paths. Interference in a communication system can come from a variety of sources depending on the particular system deployment. If the system is in motion, then Doppler induced channel variations become an issue. Furthermore, rapid channel variations can cause Doppler-induced Inter-Carrier Interference (ICI) in the frequency-domain. Interference and multipath are major factors that limit the achievable performance and capacity of a communication system because both effects interfere with the ability of a communication receiver to properly decode the transmitted data.

In a multipath propagation channel, the transmitted signal propagates to the receiver over a finite number $L_p$ of propagation paths, where each path has an associated time delay and complex gain. In such a channel, the communication receiver receives the superposition of $L_p$ delayed, attenuated, and phase-shifted copies of the transmitted signal. The number of paths $L_p$ and their time delays and phase shifts depends on the physical location of the various scattering objects (such as buildings, automobiles, and trees) in the immediate vicinity of the transmitter and receiver. The complex attenuation (magnitude and phase) of each path depends on the length of each path, as well as the material composition of any scatterers or reflectors encountered along the path.

The presence of multipath can severely distort the received signal. In a multipath environment, the multiple copies of the transmitted signal can interfere constructively in some portions of the occupied bandwidth. In other portions of the occupied bandwidth, the multiple copies can interfere destructively at the receiver. The signal duplication causes unwanted variations in the received signal strength over the bandwidth occupied by the signal. Furthermore, if the difference in the path delays of the various propagation paths is significantly greater than the duration of a transmitted information symbol, then intersymbol interference is present at the receiver. When intersymbol interference is present, the received signal is corrupted by prior transmitted symbols propagating over paths having delays relative to the shortest path that are longer than the duration of an information symbol. The demodulation process (the process of determining which information symbol was transmitted) becomes difficult in the presence of intersymbol interference.

In a mobile wireless communication system, the complex attenuation of each of the multipath components of the received signal becomes a time varying function of the transmitter's path and speed throughout the scattering field local to the transmitter's position. The transmitter's motion causes the received signal strength at a particular portion of the occupied bandwidth to vary as time progresses. In a mobile multipath channel, the overall channel response not only varies across the occupied bandwidth of the signal, but also across time as well.

In addition to multipath, interference is another system component that limits the performance of a communication system. If the system is deployed in an unlicensed band, then other users of the band can generate interference. And in a cellular system employing frequency reuse, transmitters in another cell that is allocated the same set of frequency channels can generate co-channel interference. Frequency reuse is the practice of assigning the same frequency channels to multiple users of the allocated spectrum.

Many cellular communication systems employ the technique of frequency reuse in order to maximize the utilization of the frequency spectrum allocated to a wide-area system deployment. In a cellular system, a large geographical area is divided into smaller regions called cells, where each cell is served by a single base station operating on an assigned set of frequency channels. Within each cell, multiple subscriber devices are allowed to communicate with the base station on the frequency channels assigned to that cell. The concept of frequency reuse involves allocating different sets of frequency channels to the cells belonging to a particular group and then reusing the same sets of frequencies to the cells belonging to another group of cells.

The reuse factor of a cellular system is defined to be the minimum distance between two cells that are allocated the same set of frequency channels divided by the radius of a cell. A cellular system employing a large reuse factor does not utilize the allocated spectrum as efficiently as a cellular system employing a smaller reuse factor. However, the level of co-channel interference received by a receiver in the cellular system is directly dependent on the reuse factor. Reducing the reuse factor tends to increase the level of co-channel interference experienced by a receiver. To better utilize the available spectrum, it would be advantageous to be able to suppress the effects of co-channel interference.

To suppress co-channel interference, adaptive antenna signal processing can be used. In a broadband wireless communication system, adaptive antennas promise to increase system performance and capacity by suppressing interference and providing a diversity gain for equalization. Furthermore, adaptive antennas can increase capacity through Spatial Division Multiple Access (SDMA), where multiple subscriber devices share the same time-frequency channel and are separated on the basis of their spatial channel responses. However, for best performance, the adaptive antenna combining algorithm must be able to compensate for time and frequency variations in the channel responses of both the desired and interference signals. Failure to correct for the channel variations in either time or frequency will result in poor performance.

Thus, there is a need for a method and device for combining the outputs of at least one receive antenna in the presence of severe time variations in the channel response for the purposes of equalization and interference suppression.

DETAILED DESCRIPTION OF THE PRESENTLY PREFERRED EMBODIMENTS

Figure 1:
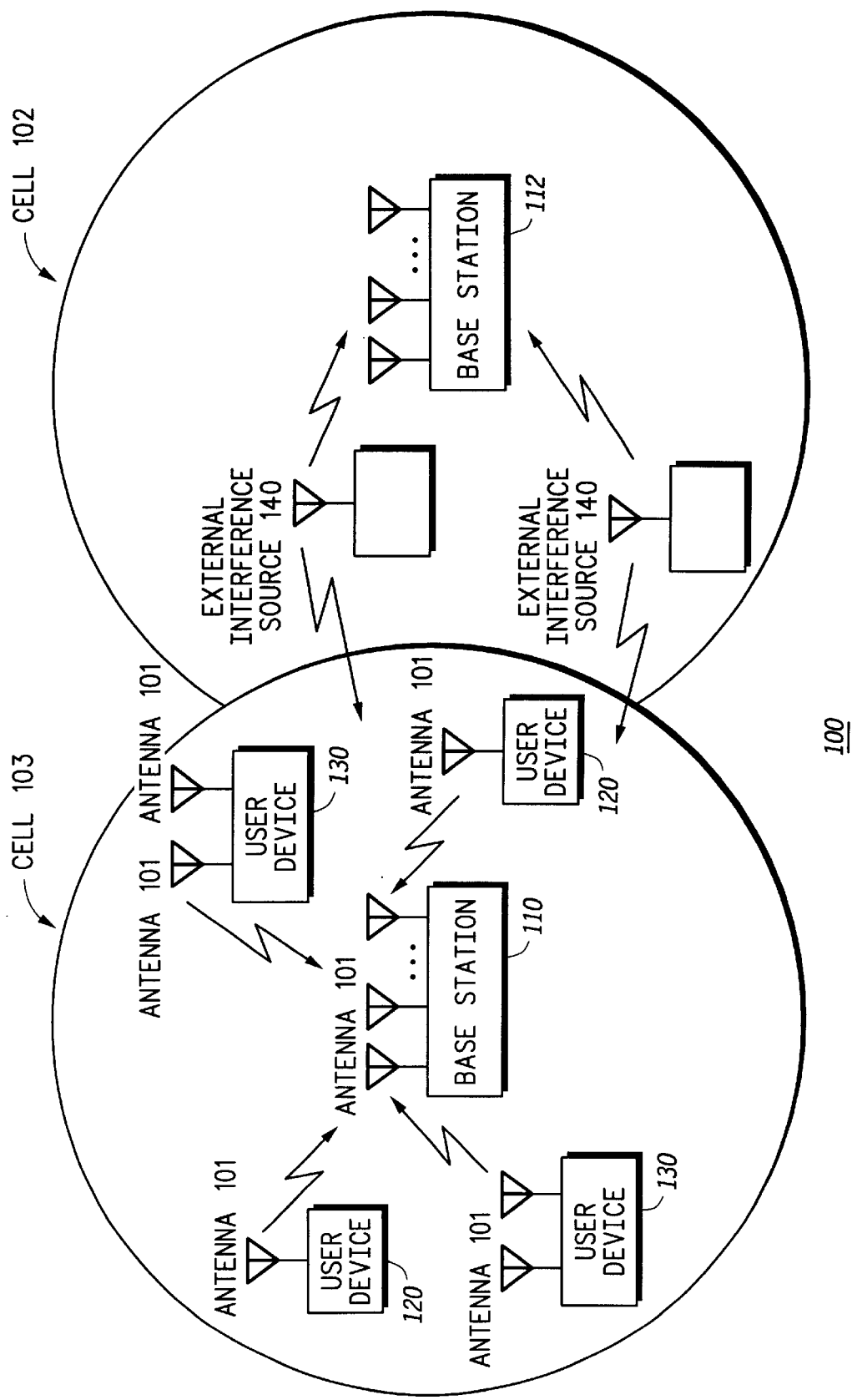
FIG. 1 is an overview diagram of a preferred embodiment of a cellular communication system in accordance with the present invention.

An adaptive antenna array is an array of antennas connected to a communications receiver and operates by combining the signals received by the antennas so as to optimize in an adaptive fashion the receive characteristics of the array. By weighting and then summing the multiple antenna signals, the adaptive antenna array can adapt its angular response, sometimes called the array pattern, while it operates in response to changes in the propagation environment. While operating, the adaptive antenna attempts to maximize the reception of the signal received from a desired transmitting device, as it simultaneously minimizes the effects of all other interfering signals and noise. In a communication system, the interference suppression capability of an adaptive antenna array offers the potential to reduce co-channel interference, compensate for Inter-Carrier Interference (ICI), improve coverage quality, and increase overall system capacity.

Adaptive antenna arrays also offer the possibility of providing a new way of multiplexing multiple devices: Spatial Division Multiple Access (SDMA). With SDMA, multiple devices can simultaneously share the same channel (i.e., time, frequency, or code channel) and are separated and simultaneously decoded by the receiver array on the basis of their spatial position relative to the antenna array. When successfully deployed, SDMA promises to provide enormous increases in system capacity.

In addition, adaptive antenna arrays provide the ability to increase system capacity through Multiple Input/Multiple Output (MIMO) array processing techniques. The MIMO strategy involves deploying multiple antennas on both the transmitter and the receiver. In environments having rich multipath scattering, large increases in capacity can be achieved through appropriate transmit and receive signal processing techniques. An example MIMO strategy calls for each antenna on the transmitter to transmit an independent data stream, and the receive array must deploy SDMA techniques to separate and decode the multiple transmitted streams.

Spatial Division Multiple Access and Multiple Input/Multiple Output are difficult technologies to implement because of the rapidly varying multipath fading channel. In an SDMA system, the devices that are sharing a channel provide interference to the receiver processing algorithms that must decode the signals transmitted by the devices. When a receiver-processing algorithm attempts to decode one SDMA device, the other SDMA devices provide strong interference to the decoding algorithm. The adaptive antenna implementing SDMA suppresses the effects of the other devices when attempting to decode one of the transmitting devices. In a MIMO system, the multiple antennas of the transmitter interfere with each other at the receive array, and the receiver has similar difficulties as with an SDMA system.

A problem associated with employing both an equalizer and an adaptive antenna in a wireless communication system lies in the design of an algorithm and device having adequate ability to adapt to changes in the signal environment. For best performance, adaptive antennas that operate in a fast-fading multipath environment must adapt to the rapidly varying channel as well as to any changes in the nature of the desired and interfering signals. In a broadband system, a frequency-selective multipath channel will cause significant variations in the channel across the occupied bandwidth of the received signal. Equalization and interference-suppression algorithms, which cannot track these channel variations both in time and frequency, will suffer significant degradation in performance as measured by the Bit-Error Rate (BER) or Signal-to-Interference-plus-Noise Ratio (SINR).

A common ingredient in many equalizers and adaptive antenna arrays is an algorithm and device that estimates the characteristics of the multipath propagation environment, channel transfer function, or channel frequency response, between the desired transmitting device and each of the at least one receiving antenna at the communication receiver. When SDMA or MIMO is being employed in a broadband system operating in a frequency-selective environment, then an adaptive antenna array generally requires an estimate of the channel frequency response between each receiving antenna and each of the transmitting devices or antennas that are simultaneously sending information to the array. The channel estimation algorithm in this case should operate to simultaneously solve for the channel responses of the multiple transmitting devices or antennas. Performing a simultaneous estimate of the channel responses of multiple transmitting devices is a difficult operation in a mobile broadband communication system operating in a multipath-rich environment with high frequency selectivity. Strong interference caused by an SDMA or MIMO deployment, Doppler induced ICI, or a low reuse factor causes even more difficulty to the channel estimation algorithms. It would therefore be advantageous for a device to be able to compute an accurate channel frequency response estimate in the presence of SDMA interference, MIMO interference, Inter-Symbol Interference (ISI), ICI, and co-channel interference. It would also be advantageous for a device to be able to track any variations in the channel frequency response of multiple mobile users whose channel responses will vary as the users move.

Given the need for higher system capacities in wireless communication systems, adaptive antennas and advanced equalization techniques are important for satisfying the ever-increasing need for high data rate communications. To support the operation of adaptive antennas and equalizers, it is advantageous to have a method and device that tracks the time-varying frequency response of a broadband system accurately enough to permit effective equalization and interference suppression. Given the difficulties associated with implementing SDMA and the deleterious nature of the multipath-fading environment, such a device would enable improved equalization and interference suppression performance in a mobile broadband communication system.

Briefly described, the present invention is a method and device for calculating the adaptive antenna combining weights for the at least one transmitting device for the purposes of jointly equalizing the at least one received signal, while simultaneously suppressing interference in a communication receiver, in order to recover the information transmitted by the at least one transmitting device. In a highly frequency-selective mobile propagation channel, the ability to accurately track the variations in the channel response over both the time and frequency dimensions is critical to the proper operation of any equalization or interference suppression algorithm.

This invention utilizes channel estimates from an existing estimation technique to compute the fixed in time adaptive antenna combining weights that provide interference suppression and compensate for Doppler induced variations (i.e., ICI). A novel feature of the present invention is that a fixed (constant in time) set of adaptive array combining weights are computed that are highly effective at equalizing and suppressing interference in a rapidly varying environment.

In order for adaptive antenna combining algorithms to be able to equalize a desired user's signal and/or suppress interference in a mobile wideband digital communication system, the channels of all signals must be accurately tracked across frequency and in time. The present invention's combining algorithms compensate for rapid variations in the channel response and can even compensate for severe channel variations within a data block, where a data block is a group of received time-domain symbols that are transformed into the frequency domain (e.g., with a Discrete Fourier Transform (DFT)).

The method and device of the present invention can be incorporated into a communications receiving device, base station, or subscriber unit. In the present invention, the term "device" can refer to any type of communications device such as a base station, subscriber unit, or other communications receiver or transmitter.

The present invention is implemented in a communication system where at least one desired transmitting device transmits information to a communication receiver having at least one antenna. In a preferred embodiment, pluralities of transmitting devices simultaneously transmit information to a communication receiver having a plurality of antennas. A transmitting device transmits its information in bursts that contain two components: a training interval and a data interval. The information transmitted in a training interval contains pilot symbol sequences of content and duration known by both the transmitting device and the communication receiver. The data interval contains data symbols also called blocks that must be recovered at the receiving device. In the present invention, the term "burst" refers to any one of the following: a short or isolated transmission, a portion of a longer transmission, a portion of a continuous transmission, a portion of a semi-continuous transmission, a time-limited transmission, a bandwidth-limited transmission, or any combination thereof.

The method and device of the present invention provides for a means of weighting and summing the outputs of at least one receive antenna to simultaneously receive and recover the information transmitted simultaneously by at least one transmitting device. Also if more than one antenna is present at the communication receiver, then the method and device of the present invention can be used to enable an adaptive antenna to mitigating the effects of unwanted interference transmitted by other users of the occupied bandwidth, as well as motion induced ICI, and ISI.

The ability to receive and recover the information transmitted simultaneously by more than one device significantly increases the capacity of the communication system. Conventional cellular systems permit only one device to transmit on a particular frequency channel within a cell for any predetermined time interval. Providing for more than one device to transmit to a base station on the same frequency channel at the same time will multiply the capacity of the system by a factor equal to the number of devices that are allowed to simultaneously transmit. Devices incorporating algorithms for providing this capability must have the ability to compensate for time and frequency variations in each desired transmitter's and each interferer's channel. The method and device of the present invention provide fixed in time adaptive antenna interference suppression and equalization, utilizing new combining weight techniques, making communication systems more efficient.

A preferred embodiment of the present invention described below typically operates in a time-varying delay-spread channel and operates under the assumption that the channel can change significantly over the occupied bandwidth and significantly in time. This invention requires channel estimates from a multi-user channel estimation technique that tracks the time and frequency variations of multiple transmitting devices (or antennas) sharing the same time frequency channel.

One limiting factor to the implementation of adaptive antenna combining weights in broadband communications is ISI, which can cause severe frequency selectivity. Equalizing or suppressing interference in a broadband channel with traditional time-domain techniques becomes a complex problem when the channel length becomes much larger than the symbol time. As a result, Orthogonal Frequency Division Multiplexing (OFDM) and frequency-domain equalization techniques have been proposed to combat the high level of ISI that is typical in broadband channels.

An additional problem occurs when the end-users are mobile. The speed of the mobiles causes significant time variations necessitating combining weights that compensate for the variations in the desired transmitter's and unknown interferer's channels. The present invention uses a conceptual model that characterizes the time-varying channel between a single transmit and single receive antenna as the sum of multiple time-invariant channels called "Doppler" channels. This is done through the following equation:

$$h_u(l, n) = \sum_{v=-V}^{+V} h_{u,v}(n) e^{-j2\pi v l/N_k} e^{j2\pi v n/N_k}$$

time n for desired transmitting device u for l=0...L−1, $N_k$ is the Doppler DFT size (typically $N_k$ is chosen to be twice the length of the number of time-domain samples in an information burst), and $h_{u,v}(n)$ is the $v^{th}$ time-domain Doppler channel for user u.

The method and device of the present invention uses the time-invariant Doppler channel estimates for each user to get Minimum Mean Squared Error (MMSE) fixed in time adaptive antenna combining weights. The first set of fixed in time weights, called the Null Doppler weights, null out all Doppler channels except the $v^{th}$ Doppler channel for user u.

The second set of fixed in time weights, called the Zero-Forcing Doppler weights, again null out all Doppler channels except the $v^{th}$ Doppler channel for user u. However, in many cases, the Zero-Forcing Doppler weights are less computationally complex with similar BER performance as the Null Doppler weights. The third set of weights are fixed in time weights that are the solution to a Minimum Mean Squared Error (MMSE) criteria and thus have better performance than the Zero-Forcing Doppler or Null Doppler weights. An important advantage of all of the fixed in time combining weights is that they greatly reduce the computational complexity over combining weights that are computed at each data block.

FIG. 1, numeral 100, illustrates a wireless communication system in accordance with the preferred embodiment of the present invention. As shown in FIG. 1, a Base Station 110 provides communication service to a geographic region known as a cell 103. At least one User Devices 120 and 130 communicate with the Base Station 110. In some embodiments of the communication system of FIG. 1, at least zero External Interference Sources 140 share the same spectrum allocated to the base station 110 and subscriber devices 120 and 130. The External Interference Sources 140 represent an unwanted source of emissions that interferes with the communication process between the Base Station 110 and the User Devices 120 and 130. The exact nature and number of the External Interference Sources 140 will depend on the specific embodiment of the communication system of FIG. 1. In some cases, as is shown in FIG. 1, an External Interference Source will be another User Device 140 (similar in construction and purpose to User Device 120) that is communicating with another Base Station 112 in the same frequency spectrum allocated to Base Station 110 and User Devices 120 and 130. As shown in FIG. 1, User Devices 120 has a single antenna, while User Devices 130 have at least one antenna. The method and device of the present invention can be implemented as part of a Base Station 110 as well as part of a User Device 120 or 130.

Figure 2:
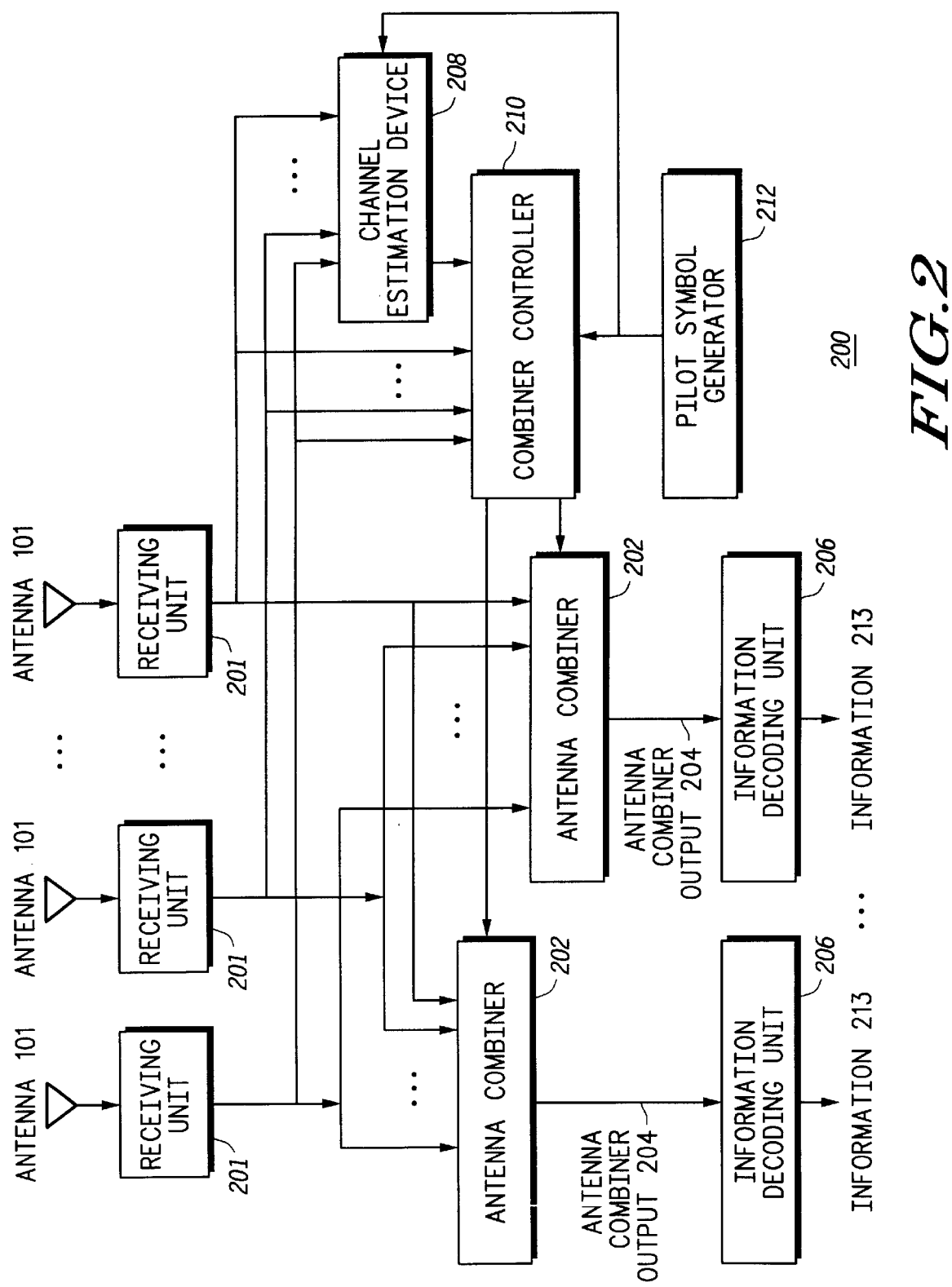
FIG. 2 is a block diagram illustrating a preferred embodiment of a device in accordance with the present invention.

FIG. 2, numeral 200, is a block diagram illustrating a device in accordance with the present invention. The communication receiver in accordance with the present invention includes at least one antenna (101) wherein the outputs of the antennas are each provided to a receiving unit (201). The outputs of the receiving units (201) are provided to at least one Antenna Combiner (202). The signals from the receiving units (201) are also fed into the Combiner Controller (210), which regulates the operation of the at least one Antenna Combiner (202). The signals from the receiving units (201) are also fed into the Channel Estimation Device (208). The Pilot Symbol Generator (212) generates pilot symbol information that is used by the Combiner Controller (210) to control the Antenna Combiner (202). The pilot symbol information generated by the Pilot Symbol Generator (212) is also used by the Channel Estimation Device (208) to estimate the time-varying frequency responses of the transmitting devices (110, 112, 120, 130, or 140, or any combination thereof). The output of an Antenna Combiner (202) is fed into an Information Decoding Unit (206), which decodes the Antenna Combiner Output (204) and generates data information (213) that was received by the Antennas (101).

Figure 3:
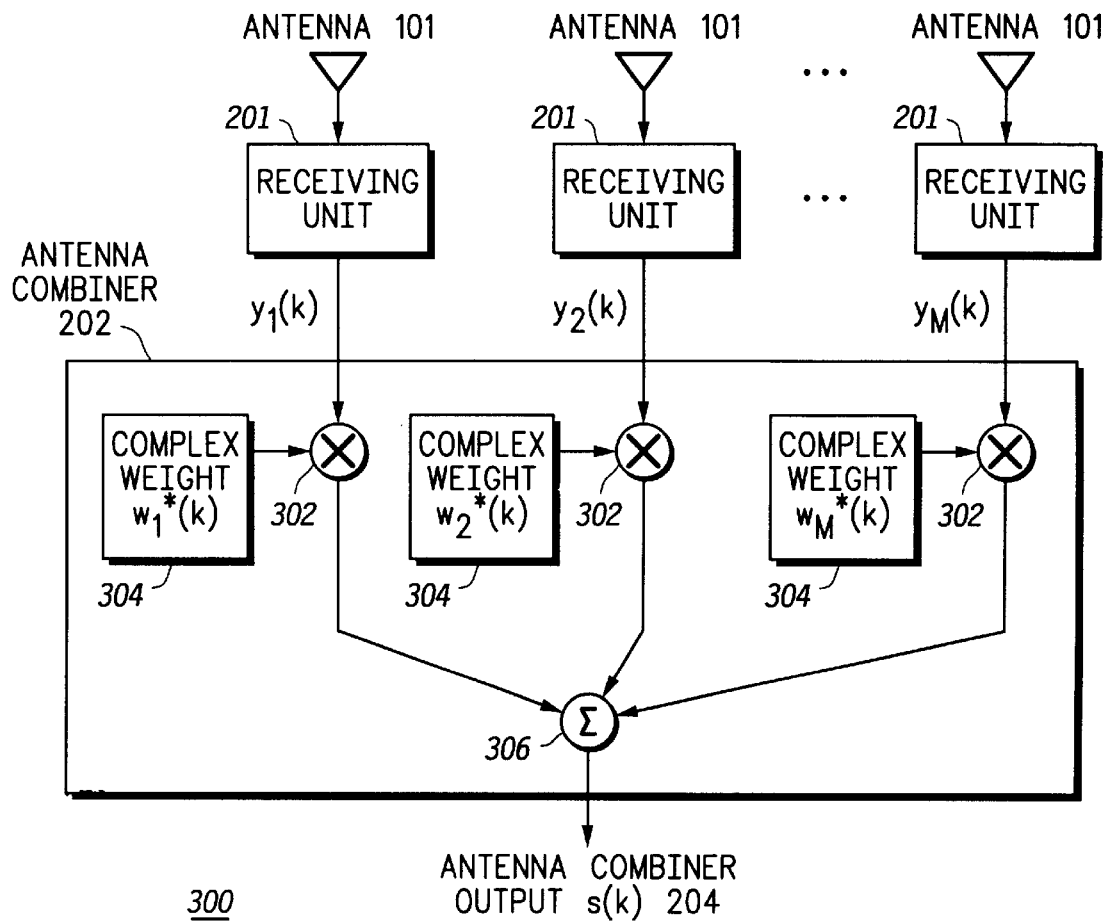
FIG. 3 is a block diagram illustrating details of the Antenna Combiner of the device of FIG. 2.

FIG. 3, numeral 300, is a block diagram illustrating details of the Antenna Combiner of the device of FIG. 2. Antenna Combiner (202) is coupled to the receiving units (201), which in turn are coupled to the antennas (101). In a preferred embodiment, the receiving units (201) may include radio frequency pre-amplifiers, filters, and other devices that can be used to convert the radio frequency signal received by the antenna down to a digital stream of baseband equivalent complex symbols. As shown in FIG. 2, the output of the i'th receiving unit (201) (where i is an integer between 1 and M inclusive, and M is the total number of antenna elements) is mathematically denoted by $y_i(k)$, where k and i are integers, and is provided to the antenna combiner (202) which can be in the form of a plurality of complex multipliers (302) which multiply the output of each receiving unit (201) by a complex weight (304), mathematically denoted as $w_i(k)$, and a combiner (306) sums the outputs of the plurality of complex multipliers (302). The values of the complex weights (304) are controlled by the Combiner Controller (210), which are described in more detail below.

Figure 4:
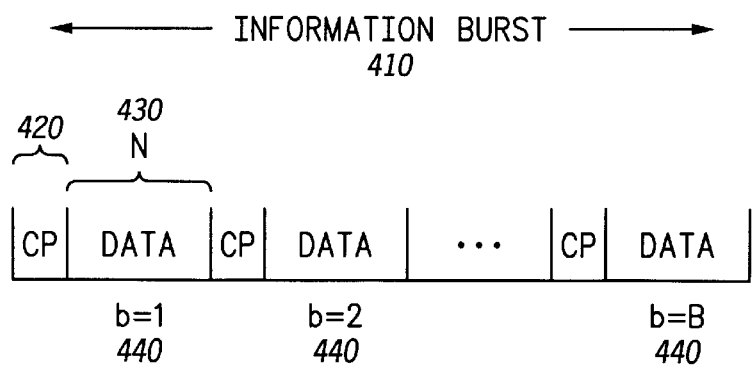
FIG. 4 is a representation of an information burst for a communication system with regular cyclic prefixes.

FIG. 4, numeral 400, is a timing diagram illustrating the structure of an information burst for a communication system with cyclic prefixes (420) transmitted between a plurality of transmitting devices (e.g., Base station 110, User Device 120, or 130) and a receiving device (e.g., Base station 110, User Device 120, or 130). A cyclic prefix (420) is a repetition of the last $L_{CP}$ (where $L_{CP}$ is typically chosen to be longer than the expected channel length in time-domain samples) data symbols right before a data block (430). An information burst (410) includes a cyclic (420) and at least one block (data interval), N (430). It should be noted that by blocks it is meant the N symbols that are DFT'd into the frequency domain for processing. The various blocks being transmitted are representing by the integer "b" (440).

The channel estimation device (208) provides Doppler channel estimates for the at least one desired transmitters that is used by the Combiner Controller (210) to produce combining weights utilizing the method and device of the present invention. The fixed in time combining weight calculations for all communication systems (that is: systems using a cyclic prefix and systems not using a cyclic prefix) are expressed in FIG. 5 and FIG. 6, and the calculations for the fixed in time combining weights for null cyclic prefix communication systems are expressed in FIG. 7. The term null cyclic prefix means that the cyclic prefix consists of $L_{cp}$ zeros instead of the repeated symbols from the end of a data block. A mathematical derivation of the combining weights is now given.

The received M×1 (where M is the number of receivers) time-domain signal on block b is modeled as $$y(n,b) = \sum_{u=1}^{U} \sum_{v=-V}^{V} \sum_{l=0}^{L-1} h_{u,v}(l) z_u(n-l,b) e^{j2\pi v n_b / N_k} + n(n,b) \qquad (1)$$

where U is the number of transmitting devices, $V_T=(2V+1)$ is the number of Doppler channels, L is the number of time taps in each Doppler channel, $h_{u,v}(l)$ is transmitter u's $v^{th}$ Doppler channel, b indicates the block number, $N_k$ is the Doppler DFT size (typically chosen to be twice the size of the total number of time-domain samples in a data burst), $n_b$ is the absolute time reference of data block b (e.g., in a communication system with regular cyclic prefixes, if data block 1 starts at time $n_1=0$, then data block b would be at time $n_b=(b-1)(N+L_{cp})$ where $L_{cp}$ is the length of the cyclic prefix), for systems with cyclic prefixes [$(n)_N$ mean n mod N]:

$$z_{u,v}(n,b) = x_u((n)_N, b) e^{j2\pi v n / N_k} \qquad (2)$$

and for systems with no cyclic prefixes:

$$z_{u,v}(n,b) = x_u(n,b) e^{j2\pi v n / N_k} \qquad (3)$$

The frequency-domain received symbols on block b are given as:

$$Y(k, b) = \frac{1}{\sqrt{N}} \sum_{n=0}^{N-1} y(n, b) e^{-j2\pi kn/N} \quad (4)$$

With some manipulation, Y(k,b) becomes:

$$Y(k, b) = \frac{1}{\sqrt{N}} \sum_{u=1}^{U} \sum_{v=-V}^{V} e^{j2\pi v n_b/N_k} \sum_{l=0}^{L-1} h_{u,v}(l) Z_{u,v,l}(k, b) + N(k, b) \quad (5)$$

where $$Z_{u,v,l}(k, b) = \sum_{n=0}^{N-1} z_{u,v}(n-l, b) e^{-j2\pi kn/N} \quad (6)$$

The Null Doppler weights derived by assuming the received frequency-domain signal is (for any communication system)

$$Y(k, b) = \sum_{u=1}^{U} \sum_{v=-V}^{V} H_{u,v}(k) Z_{u,v}(k, b) + N(k, b),$$

frequency-domain Doppler channel, N(k,b) is an M×1 (M=# of antennas) noise vector, and $Z_{u,v}(k,b)$ is $$Z_{u,v}(k, b) = \sum_{n=0}^{K-1} z_{u,v}(n, b) e^{-j2\pi kn/N}.$$

The Null Doppler combining weights for transmitter u and Doppler channel v are found as the solution to $$\min_{w_{u,v}(k)} E\{|w_{u,v}^H(k) Y(k, b) - Z_{u,v}(k, b)|^2\}$$

where it is assumed that (where E{X} means the expected value of X):

$$E\{Z_{u,v}(k,b) Z^*_{p,w}(k,b)\} = \delta(u-p)\delta(v-w),$$

while $\delta(n)=1$ if n=0 and $\delta(n)=0$ otherwise. The solution is $w_{u,v(k)}=(R_T(k))^{-1} H_{u,v}(k)$, where $R_T(k)=R(k)+R_c(k)$, $$R(k) = \sum_{u=1}^{U} \sum_{v=-V}^{V} H_{u,v}(k) H_{u,v}^H(k),$$

and $R_c(k)$ is the spatial correlation matrix of the corrupting environment (in the preferred embodiment when there is no significant unknown interference, $R_c(k)=\sigma_n^2 I_M$ where $\sigma_n^2$ is the frequency-domain noise power and $I_M$ is an M×M identity matrix).

An alternate set of combining weights, called the Zero-Forcing Doppler combining weighs, can be found as the solution to $W^H(k)G(k)=I_{UV_T}$, where $I_m$ is an m×m identity matrix, $V_T$ is the total number of Doppler channels, and W(k) and G(k) are: (M×UV_T) $G(k)=[H_{1,-V}(k), \ldots, H_{1,V}(k), H_{2,-V}(k), \ldots, H_{U,V}(k)]$
$W(k)=[w_{1,-V}(k), \ldots, H_{1,V}(k), H_{2,-V}(k), \ldots, H_{U,V}(k)].$ Each column of W(k) contains one of the desired transmitter's combining weights for one of the Doppler channels. The solution to $W^H(k)G(k)=I_{U,V_T}$ is given by the right pseudo inverse of G(k): $W(k)=G(k)(G^H(k)G(k))^{-1}$.

The advantage that these Zero-Forcing Doppler weighs have over the regular Null Doppler weights given above is that they have lower computational complexity when M>UV_T. The problems with the Zero-Forcing Doppler weights are that they are not easily extended to handle unknown interference, and no solution exists if UV_T>M. The fixed in time MMSE Doppler weights are given as the solution to:

$$\min_{w_{u,v}(k)} E\left\{\sum_{b=1}^{B} |w_{u,v}^H(k) Y(k, b) - Z_{u,v}(k, b)|^2\right\} \quad (32)$$

The solution is:

$$W_{u,v}(k)=(R(k)+\sigma_n^2 I)^{-1} P_{u,v}(k) \quad (33)$$

where $\sigma_n^2$ is the frequency-domain noise power and:

$$R(k) = \sum_{b=1}^{B} \sum_{u=1}^{U} \sum_{v=-V}^{V} \sum_{w=-V}^{V} H_{u,v}(k) H_{u,w}^H(k) \alpha_b(v-w) \quad (34)$$

$$p_{u,v}(k) = \sum_{b=1}^{B} \sum_{w=-V}^{V} H_{u,w}(k) \alpha_b(w-v) \quad (35)$$

$$\alpha_b(v) = e^{j\pi v(K-1+2n_b)/N_k} \frac{\sin(\pi v K/N_k)}{\sin(\pi v/N_k)} \quad (36)$$

Because the fixed in time MMSE Doppler weights use a better criterion for determining the combining weights, they have much better BER performance than the Null Doppler and Zero-Forcing Doppler weights.

Figure 5:
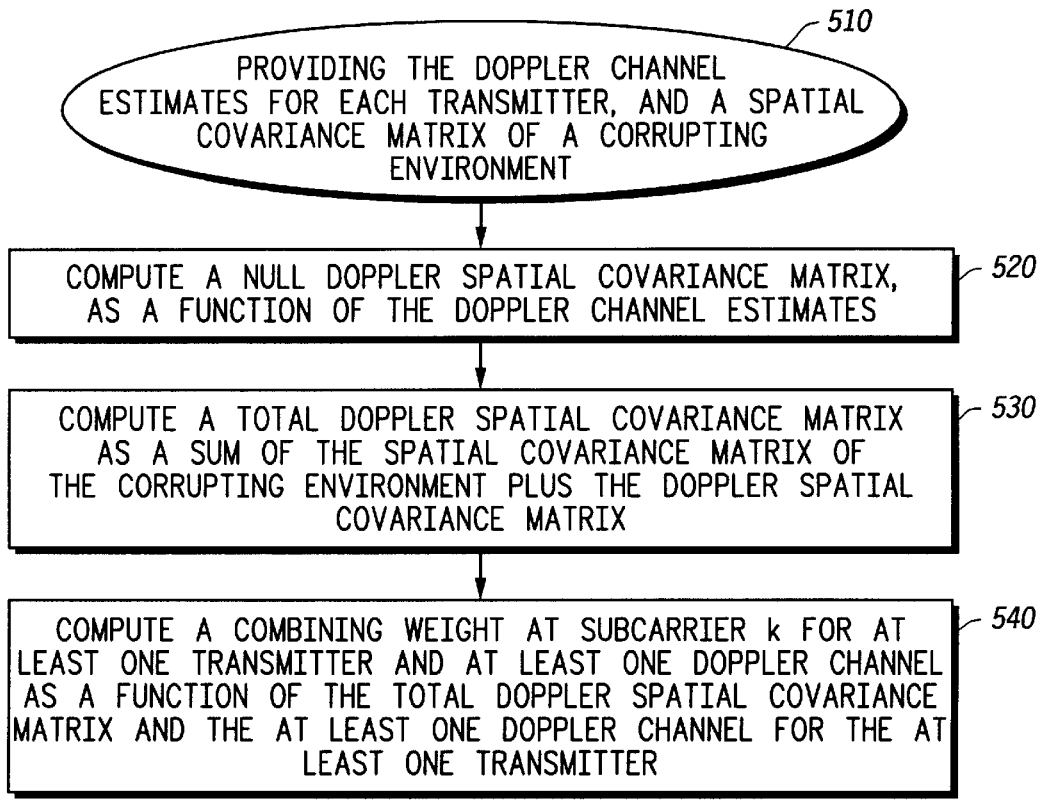
FIG. 5 is a flow chart representation of a preferred embodiment of the method performed by the device of FIG. 2 for computing fixed in time combining weights for any communication system, in accordance with the present invention.

FIG. 5 numeral 500, is a flow chart representation of fixed in time combining weight calculations for any communication system, in accordance with the present invention. These combining weights are referred to as the Null Doppler combining weights. Providing Doppler channel estimates for each transmitter, and a spatial covariance matrix of a corrupting environment (510) from the channel estimation device 208, a Null Doppler spatial covariance matrix $$R(k) = \sum_{u=1}^{U} \sum_{v=-V}^{V} H_{u,v}(k) H_{u,v}^H(k),$$

is calculated as a function of the Doppler channel estimates (520). At block 530 a total Doppler spatial covariance matrix $R_T(k)$ is then computed as a sum of the spatial covariance matrix of the corrupting environment plus the Doppler spatial covariance matrix using the aforementioned equation $R_T(k)=R(k)+R_c(k)$. Using the Null Doppler spatial covariance matrix and the total Doppler spatial covariance solutions, (540) a combining weight is computed at subcarrier k for at least one transmitter and at least one Doppler channel as in the equation $(w_{u,v}(k)=(R_T(k))^{-1} H_{u,v}(k))$.

Figure 6:
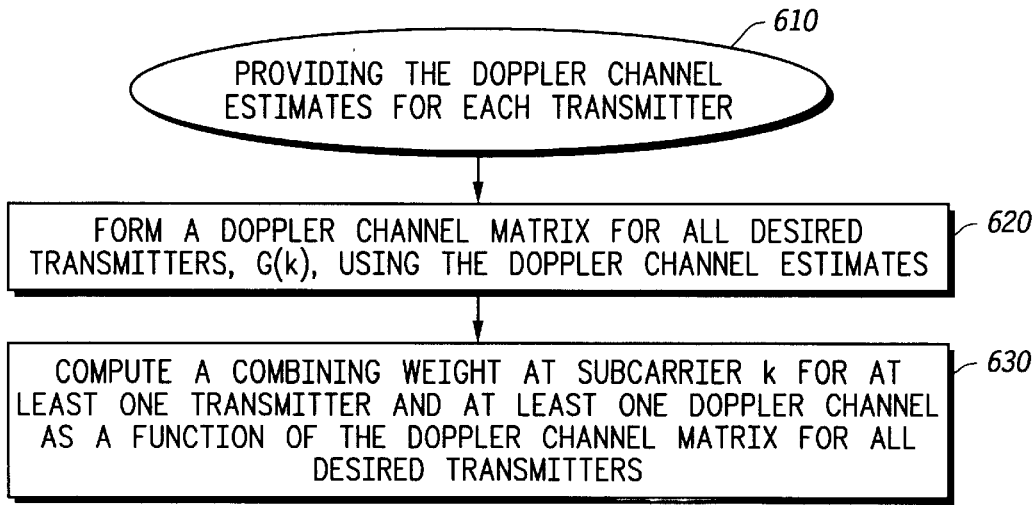
FIG. 6 is a flow chart representation of a preferred embodiment of an alternative method performed by the device of FIG. 2 for computing fixed in time combining weights for any communication system, in accordance with the present invention.

FIG. 6 numeral 600, is a flow chart representation of alternative fixed in time combining weight, the Zero-Forcing combining weights, calculations for any communication system, in accordance with the present invention. The Doppler channel estimates for each transmitter (610) provided from the channel estimation device 208, are used to form the Doppler channel matrix for all desired transmitters G(k)

$(M \times UV_T)$ $G(k)=[H_{1,-V}(k), \ldots, H_{1,V}(k), H_{2,-V}(k), \ldots, H_{U,V}(k)]$ (620). Finally in block 630, a combining weight is computed at subcarrier k for at least one transmitter and at least one Doppler channel as a function of the Doppler channel matrix for all desired transmitters. The derived equation for 630 is $W(k)=G(k)(G^H(k)G(k))^-$.

Figure 7:
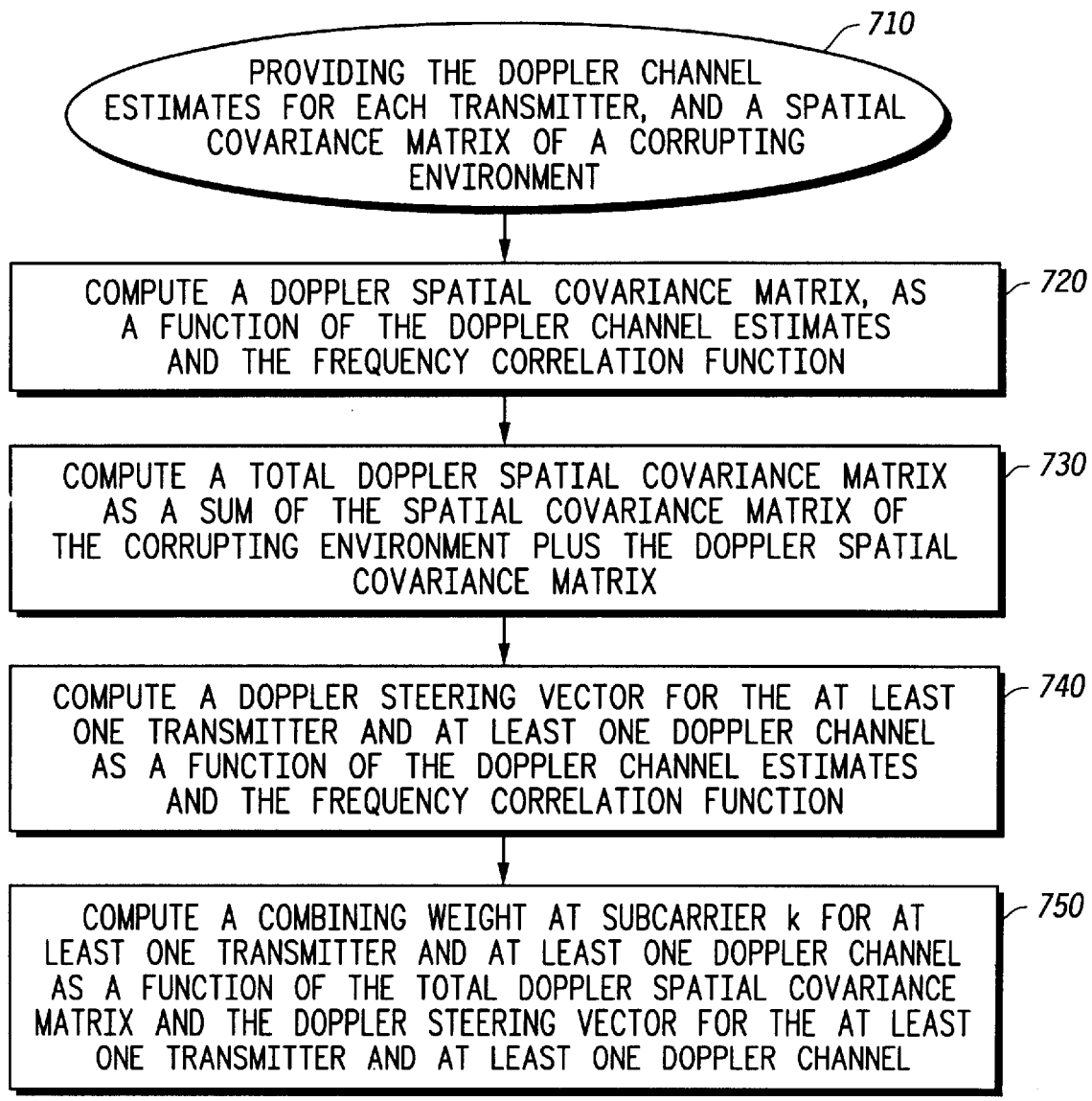
FIG. 7 is a flow chart representation of a preferred embodiment of the method performed by the device of FIG. 2 for computing fixed in time combining weights for communication systems with null cyclic prefixes, in accordance with the present invention.

FIG. 7 numeral 700, is a flow chart representation of fixed in time combining weight calculations for communication systems with null cyclic prefixes, in accordance with the present invention. Providing the Doppler channel estimates for each transmitter, and a spatial covariance matrix of a corrupting environment (710) from the channel estimation device 208, a Doppler spatial covariance matrix is computed as a function of the Doppler channel estimates and the frequency correlation function (720). The Doppler spatial covariance matrix R(k) is equated for information bursts having null cyclic prefixes as $$R(k) = \sum_{b=1}^{B} \sum_{u=1}^{U} \sum_{v=-V}^{V} \sum_{w=-V}^{V} H_{u,v}(k) H_{u,w}^{H}(k) \alpha_b(v-w)$$

where the frequency correlation function, $\alpha_b(V)$, is $$\alpha_b(v) = e^{j\pi v(K-1+2n_b)/N_k} \frac{\sin(\pi v K/N_k)}{\sin(\pi v/N_k)}.$$

At block 730, a total Doppler spatial covariance matrix is then computed as a sum of the spatial covariance matrix of the corrupting environment plus the Doppler spatial covariance matrix $(R_T(k)=R(k)+R_c(k))$. A Doppler steering vector for the at least one transmitter and at least one Doppler channel is computed in block 740 as a function of the Doppler channel estimates and the frequency correlation function $$p_{u,v}(k) = \sum_{b=1}^{B} \sum_{w=-V}^{V} H_{u,w}(k) \alpha_b(w-v).$$

With the total Doppler spatial covariance, the Doppler steering vector for at least one transmitter and at least one Doppler channel (750), a combining weight at subcarrier k is computed for at least one transmitter and at least one Doppler channel utilizing the equation $(w_{u,v}(k)=(R_T(k))^{-P}{}_{u,v}(k))$.

Once combining weights are found, the transmitted data can be found by weighting the received frequency-domain data with the combining weights. In equation form this is expressed as: $\hat{X}_{u,v}(k,b)=w_{u,v}^{H}(k)Y(k,b)$ where $\hat{X}_{u,v}(k,b)$ is the estimated frequency-domain symbol of user u for Doppler channel v. To obtain an estimate of the time-domain transmitted symbols, $\hat{X}_{u,v}(k,b)$ needs to be brought back to the time domain and be de-rotated by the conjugate of the $v^{th}$ Doppler sinusoid. In equation form, this process is expressed in the following two steps: First, the time-domain symbol estimates for user u and Doppler channel v are:

$$\hat{x}_{u,v}(n,b) = \frac{1}{\sqrt{N}} \sum_{k=0}^{N-1} \hat{X}_{u,v}(k,b) e^{j2\pi kn/N}.$$

Then, the estimated time-domain symbols for user u are given as: $\hat{x}_u(n,b)=\hat{x}_{u,v}(n,b)e^{-j2\pi v(n+n_b)/N_k}$.

The present invention may be embodied in other specific forms without departing from its spirit or essential characteristics. The described embodiments are to be considered in all respects only as illustrative and not restrictive.

We claim:

1. A method of operating a communication system comprising:

providing at least one Doppler channel estimate for at least one transmitter and a spatial covariance matrix of a corrupting environment;

computing a Null Doppler spatial covariance matrix, as a function of the Doppler channel estimates;

computing a total Doppler spatial covariance matrix as a sum of the spatial covariance matrix of the corrupting environment plus the Doppler spatial covariance matrix; and computing a combining weight at subcarrier k for at least one transmitter and at least one Doppler channel as a function of the total Doppler spatial covariance and the at least one Doppler channel for the at least one transmitter.

2. The method of claim 1 wherein the Null Doppler spatial covariance matrix R(k) for at least one receiver is computed according to $$R(k) = \sum_{u=1}^{U} \sum_{v=-V}^{V} H_{u,v}(k) H_{u,v}^{H}(k).$$

3. The method of claim 1 wherein the total Doppler spatial covariance matrix for at least one receiver is computed according to $R_T(k)=R(k)+R_c(k)$.

4. The method of claim 1 wherein the combining weight for at least one Doppler channel is computed according to $w_{u,v}(k)=(R_T(k))^{-1}H_{u,v}(k)$.

5. A method of operating a communication system including at least one receiver comprising:

providing the Doppler channel estimates for at least one transmitter;

determining a Doppler channel matrix for the at least one transmitter G(k), using the Doppler channel estimates; and computing a combining weight at subcarrier k for at least one transmitter and at least one Doppler channel as a function of the Doppler channel matrix for all desired transmitters.

6. The method of claim 5 wherein a Doppler channel matrix for at least one transmitter is determined according to $(M \times UV_T)$ $G(k)=[H_{1,-V}(k), \ldots, H_{1,V}(k), H_{2,-V}(k), \ldots, H_{U,V}(k)]$ wherein $H_{U,V}(k)$ is transmitter u's $v^{th}$ frequency-domain Doppler channel.

7. The method of claim 5 wherein the weight for at least on transmitter and at least one Doppler channel are computed according to $W(k)=G(k)(G^H(k)G(k))^{-1}$.

8. A method of operating a communication system including at least one receiver comprising:

providing at least one Doppler channel estimate for at least one transmitter, and a spatial covariance matrix of a computing environment;

providing a frequency correlation function;

computing a Doppler spatial covariance matrix as a function of the Doppler channel estimate and the frequency correlation function;

computing a total Doppler spatial covariance matrix as a sum of the spatial covariance matrix of the corrupting environment plus the Doppler spatial covariance matrix;

computing a Doppler steering vector for the at least one transmitter and at least one Doppler channel as a function of the Doppler channel estimates and the frequency correlation function; and computing a combining weight at subcarrier k for at least one transmitter and at least one Doppler channel as a function of the total Doppler spatial covariance and the Doppler steering vector for the at least one transmitter and at least one Doppler channel.

9. The method of claim 8 wherein a Doppler spatial covariance matrix for at least one receiver is computed according to $$R(k) = \sum_{b=1}^{B}\sum_{u=1}^{U}\sum_{v=-V}^{V}\sum_{w=-V}^{V} H_{u,v}(k)H_{u,w}^{H}(k)\alpha_b(v-w)$$

wherein the frequency correlation function, $\alpha_b(v)$ is $$\alpha_b(v) = e^{j\pi v(K-1+2n_b)/N_k} \frac{\sin(\pi v K/N_k)}{\sin(\pi v/N_k)}.$$

10. The method of claim 8 wherein a total Doppler spatial covariance matrix for at least one receiver is computed according to $R_T(k)=R(k)+R_c(k)$ wherein $R_c(k)$ is the spatial correlation matrix of the corrupting environment.

11. The method of claim 8 wherein a Doppler steering vector for at lest one transmitter and at least one Doppler channel is computed according to $$p_{u,v}(k) = \sum_{b=1}^{B}\sum_{w=-V}^{V} H_{u,w}(k)\alpha_b(w-v).$$

12. The method of claim 8 wherein a combining weight at subcarrier k for at least one transmitter and at least one Doppler channel is computed according to $w_{u,v}(k)=(R_T(k))^{-1}p_{u,v}(k)$.

13. A receiver for a wireless communication system comprising:
means for providing at least one Doppler channel estimate for at least one transmitter and a spatial covariance matrix of a corrupting environment;
means for computing a Null Doppler spatial covariance matrix, as a function of the Doppler channel estimates;
means for computing a total Doppler spatial covariance matrix as a sum of the spatial covariance matrix of the corrupting environment plus the Doppler spatial covariance matrix; and
means for computing a combining weight at subcarrier k for at least one transmitter and at least one Doppler channel as a function of the total Doppler spatial covariance and the at least one Doppler channel for the at least one transmitter.

14. A receiver for a wireless communication system comprising:
means for providing the Doppler channel estimates for at least one transmitter;
means for determining a Doppler channel matrix for the at least one transmitter G(k), using the Doppler channel estimates; and
means for computing a combining weight at subcarrier k for at least one transmitter and at least one Doppler channel as a function of the Doppler channel matrix for all desired transmitters.

15. A receiver for a wireless communication system comprising:
means for providing at least one Doppler channel estimate for at least one transmitter, and a spatial covariance matrix of a computing environment;
means for providing a frequency correlation function;
means for computing a Doppler spatial covariance matrix as a function of the Doppler channel estimate and the frequency correlation function;
means for computing a total Doppler spatial covariance matrix as a sum of the spatial covariance matrix of the corrupting environment plus the Doppler spatial covariance matrix;
means for computing a Doppler steering vector for the at least one transmitter and at least one Doppler channel as a function of the Doppler channel estimates and the frequency correlation function; and
means for computing a combining weight at subcarrier k for at least one transmitter and at least one Doppler channel as a function of the total Doppler spatial covariance and the Doppler steering vector for the at least one transmitter and at least one Doppler channel.

16. A computer readable medium storing a computer program comprising:
computer readable program code for providing at least one Doppler channel estimate for at least one transmitter and a spatial covariance matrix of a corrupting environment;
computer readable program code for computing a Null Doppler spatial covariance matrix, as a function of the Doppler channel estimates;
computer readable program code for computing a total Doppler spatial covariance matrix as a sum of the spatial covariance matrix of the computing environment plus the Doppler spatial covariance matrix; and
computer readable program code for computing a combining weight at subcarrier k for at least one transmitter and at least one Doppler channel as a function of the total Doppler spatial covariance and the at least one Doppler channel for the at least one transmitter.

17. A computer readable medium storing a computer program comprising:
computer readable program code for providing the Doppler channel estimates for at least one transmitter;
computer readable program code for determining a Doppler channel matrix for the at least one transmitter G(k), using the Doppler channel estimates; and
computer readable program code for computing a combining weight at subcarrier k for at least one transmitter and at least one Doppler channel as a function of the Doppler channel matrix for all desired transmitters.

18. A computer readable medium storing a computer program comprising:
computer readable program code for providing at least one Doppler channel estimate for at least one transmitter, and a spatial covariance matrix of a computing environment;
computer readable program code for providing a frequency correlation function;

computer readable program code for computing a Doppler spatial covariance matrix as a function of the Doppler channel estimate and the frequency correlation function;

computer readable program code for computing a total Doppler spatial covariance matrix as a sum of the spatial covariance matrix of the corrupting environment plus the Doppler spatial covariance matrix;

computer readable program code for computing a Doppler steering vector for the at least one transmitter and at least one Doppler channel as a function of the Doppler channel estimates and the frequency correlation function; and computer readable program code for computing a combining weight at subcarrier k for at least one transmitter and at least one Doppler channel as a function of the total Doppler spatial covariance and the Doppler steering vector for the at least one transmitter and at least one Doppler channel.

* * * * *